United States Patent Office 3,366,612
Patented Jan. 30, 1968

3,366,612
MOISTURE CURABLE ONE COMPONENT MASTIC OR CASTABLE RUBBER FORMED BY THE REACTION BETWEEN A HALOGENATED BUTYL RUBBER AND A SILANE CONTAINING A FUNCTIONAL GROUP AND HYDROLYZABLE SUBSTITUENTS
Francis P. Baldwin, Summit, N.J., and Alberto Malatesta, Rome, Italy, assignors to Esso Research and Engineering Company, a corporation of Delaware
No Drawing. Filed July 13, 1965, Ser. No. 471,754
12 Claims. (Cl. 260—85.3)

This invention relates to novel, moisture-curable polymers, methods for their preparation and their uses. More specifically, it relates to halogenated polymers or, more generally, halogen-containing rubbers, such as elastomers, plastics or so-called liquid rubbers which have been reacted with silane compounds having a functional group. In even greater particularity, it relates to the reaction product of halogenated elastomers with amino silane compounds.

In recent years there has developed considerable interest in a certain class of compounds. These can be conveniently stored or packaged with a relatively long shelf life, and can be taken out of the package and applied in applications where ordinary rubber sealants or rubber coatings are used and which will cure in place by means of the moisture which is normally present in the air. Materials of this type are useful as pipe-forming materials, potting materials, coverings for wires, pipes and cables. They are also particularly suitable as canal, ditch and reservoir liners since they can be inexpensively sprayed as a solution onto a particular surface to be coated and after the solvent has evaporated, the material will then cure by means of atmospheric moisture to provide a waterproof, weather-resistant liner. When the polymers are of low enough molecular weight, they can be compounded and spread or flowed onto a surface directly without the use of large amounts of solvents.

These materials, of course, can also be used as adhesives, sealants, industrial coatings, fabric coating and proofing agents, as well as for solid rocket propellant binders.

In general, the invention consists of reacting a halogen-containing polymer which may be either a synthetic or a halogenated natural product (e.g., Hevea rubber) with a functional silane compound. The functional group of the silane compound reacts with some quantity of the halogenated portion of the halogen-containing elastomer to incorporate —Si(R)$_3$ groups wherein R is selected from the group consisting of halogen, alkoxy and acyloxy, singly or in combination. The R groups so chosen are those which in the presence of moisture are hydrolyzed to OH groups which subsequently undergo a condensation reaction to form

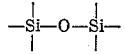

linkages, thus converting the polymer to a cross-linked network structure.

Although halogenated synthetic rubbers derived from butyl rubber or Vistanex are preferred starting materials, any halogenated or halogen-containing polymer or hydrocarbon polymer can be used. Such halogen-containing polymer is selected depending on the desired end use of the resulting moisture-curable compound, and the ease with which the —Si(R)$_3$ groups can be attached to it. These polymers include nonrubbery polymers, rubbery polymers and liquid polymers, though the invention described herein is of greatest known value for application to rubbery and liquid polymers. Included are halogenated natural rubbers and synthetic rubbers, such as nitriles, butadiene-styrene rubbers, butyl rubbers, ethylene-propylene-diolefin terpolymers, and the like. The polymers may be homopolymers of $C_2$ to $C_{20}$ olefins or diolefins or copolymers having one or more olefin monomer components having from 2 to 20 carbon atoms. Alternately, one of the monomers used to make the polymer may contain halogen, examples being vinyl bromide, 2-chlorobutadiene-1,3 and epichlorohydrin. Depending on the type of polymer and the type of use contemplated, the polymer may be chlorinated, fluorinated, brominated and iodinated. The chloro and bromo species are preferred because of their ease and economy of preparation from hydrocarbon polymers. See U.S. Patents 2,181,144, 2,291,-403, 2,213,331 and 2,944,578 for typical teachings of processes for halogenating polymers.

The halogenated hydrocarbon polymers are reacted with compounds of the type X(R)Si(R')$_3$ wherein X is a functional group capable of reacting with halogen radicals such as a primary or secondary amino group, preferably a secondary amino group. Such materials react directly with the halogenated polymer to produce the product of this invention.

Preferably, the halogen polymers contain halogen which is relatively reactive with the functional group of the silane compound. For instance, polymers wherein the halogen is present because it has replaced a hydrogen atom originally present in the polymer. However, halogen atoms present in certain monomers that are subsequently polymerized to prepare halogenated polymers can contain halogen atoms that are relatively reactive. As an example, epichlorohydrin polymers can be cited. Moreover, the location of the halogen atoms on the polymer chain with respect to electron attracting groups in the polymer also affect the reactivity of the halogen atoms.

What is conceived in this invention when using the amine substituted silicon compounds, is reaction of the amino grouping with the alkyl chloride via N alkylation or the formation of a quaternary ammonium salt as in

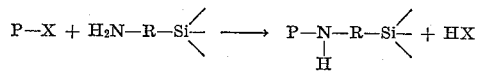

or

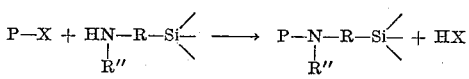

or

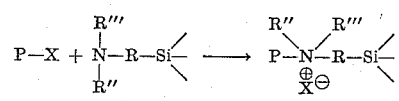

wherein P stands for polymer, X for halogen and R'' and R''' are alkyl radicals. R' can be any hydrolyzable radical such as acetoxy, halogen radicals and alkoxy radicals having from 1 to 20, preferably 1 to 10, and most preferably 1 to 3 carbon atoms. Compounds of the nature NH$_2$(CH$_2$)$_n$ Si(OR)$_3$ where $n$ is a number from 1 to 8 have been found suitable for this invention and one such compound where $n=3$ is commercially available.

Generally with respect to the silane, the secondary amine is preferred. Also, at least one of the groups on the silane atom should be readily hydrolyzable, but it is preferred that three of these be hydrolyzable. The amounts of functional silane to be used will vary to some extent depending on the degree of hydrolyzable silane functionality required to produce a vulcanized network.

Thus, if the polymer is a low molecular weight "liquid" polymer with halogen atoms at or near the ends of each chain, one would need at least 1.2 moles of the silane compound and preferably 2 moles to react with each mole of halogenated polymer. On the other hand, if the polymer were randomly or uniformly functional, as for example in brominated butyl rubber or poly-(epichlorohydrin) respectively, enough of the silane compound should be used to provide for no less than about 2.2 molecules of the silane compound for each average polymer molecule. More, of course, can be used, the upper limit being set by the cross-link density desired in the vulcanizate and the physical characteristics associated therewith.

Another method of introducing desirable silicon functionality comprises reacting a solution of the halogenated polymer with an alkoxy, acetoxy or halosilane in the presence of an alkali metal, M, i.e., the Wurtz synthesis. In this reaction what is envisioned are the steps

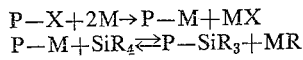

Thus, in both cases the invention involves attack on the halogenated polymer by a base, either metallic or organic, to yield the desired products.

The technique of the invention is useful for improving adhesion between and covulcanization of dissimilar polymers and copolymers by modifying one of the polymers so that it contains $Si(R)_3$ groups where at least one of the R groups is a halogen, alkoxy, alkaryloxy or acyl radical. For example, silicone rubbers or liquids containing $Si(R)_3$ groups discussed above are adhered to or covulcanized with halogenated butyl by first reacting the latter with a suitable functional silane such as disclosed above, for example γ-aminopropyl triethoxy silane. Vulcanization is achieved by exposing the reaction mixture to moisture.

Alternately, two halogenated polymers may be mixed with a functional silane as discussed, for instance, aminoalkyltriethoxy-silane, individually and then mixed or in premixed form, heated and cured by exposure to trace quantities of moisture. A steam autoclave is one suitable means for this.

The technique of the invention can also be used to prepare tapes which are useful in preparing laminates and for pressure sealing or cushioning members between rigid bodies. A tape can be conveniently manufactured as follows:

(1) A halogenated or halogen-containing polymer such as rubber is compounded with a cross-linking agent that has duel functionality with respect to halogen (e.g., a diamine) and a functional silane along with any desired fillers, plasticizers, etc.

(2) This compounded rubber is calendered to the desired thickness and either cut into strips of the proper width, or extruded into the desired shape.

(3) The strips are then cured in the absence of moisture in an air oven.

(4) Then, a silicone rubber or a modified halogenated polymer containing $Si(OR)_3$ groups compounded to have the desired degree of tack and raw strength is deposited on one or both faces of the strip.

(5) The tape is then covered with strips of material that are impermeable to moisture and can be removed at the time the tape is required for use.

Halogenated butyl rubbers modified to contain silane groups can also be compounded with hydrated salts such as $(CH_3COO)_2Ba \cdot 2H_2O$, $BaCl_2 \cdot 2H_2O$, $CaSO_4 \cdot 2H_2O$, $CuSO_4 \cdot 5H_2O$, $MgSO_4 \cdot 7H_2O$, $Na_2B_4O_7 \cdot 10H_2O$, etc., to supply internal moisture where more rapid internal curing is necessary or there is no trace atmospheric moisture. The compounded rubber, which may or may not contain other inert fillers, is then vulcanized by heating at the proper temperature, usually between 50° and 250° C. A highly cross-linked rubber can generally be obtained in a short time.

These hydrated salts can also be added to the mixtures resulting from reaction products of halogenated polymers and functional silanes blended with highly unsaturated rubbers such as SBR.

Other additives such as inert fillers, curatives and the like which are usually employed for vulcanizing unsaturated rubbers such as sulfur, accelerators, oil extenders and the like can be added. The resulting mixtures are then vulcanized by heating at 250° to 300° F. to obtain an intervulcanized butyl-SBR rubber. The technique can be used to produce other types of intervulcanizates.

When the hydrated salt technique is used, the water of hydration in the hydrated salts is driven off by the heat thus causing a uniform curing throughout the typical blend of halogenated butyl-SBR rubber. Thus, mixtures of rubbers which ordinarily are difficultly vulcanizable can be vulcanized satisfactorily using this technique.

Halogenated rubbers modified with functional silane compounds can also be compounded with solvents, preferably hydrocarbons having between 5–12 carbon atoms, and additives such as plasticizing oils and esters, rubber grade pigments such as clay, silica, carbon black, mica, talc, etc., and made into cements having a wide range of desired viscosity and thixotropic characteristics. The compounds can be made up into any color by proper pigmentation. The cement so made is used to paint masonry walls, foundations, cellar interiors, etc. The rubber cures on exposure to moisture to form a strongly adhered barrier coating.

The silane modified halogenated rubbers of the invention can also be compounded into mixtures having a viscosity similar to mixtures for rubber tires. The compounded rubbers are dissolved in a solvent (e.g., hexane, heptane) to form a cement. The viscosity of the cement is controlled by the solvent concentration or by the inclusion of additives to provide thixotropic behavior (e.g., finely divided silica). These cements can then be used for ditch lining.

An area to be coated may be first wet with water, then the cement sprayed on or run on from a tar truck. The lining will cure on contact with the moist surface and the upper material will cure in time as solvent is evaporated and moisture is picked up from the air and the ground.

The resulting lining will fit the exact contour of the pit or ditch on a microscopic scale and the toughness of the lining will preclude damage by cattle, etc. Patches, when needed, are simply applied, merely by filling the void with the described cements.

A solventless, hard, heat-resistant coating material can be prepared by reaction of aromatic compounds containing at least two ring substituted halomethyl groups with $SiR_4$ in which at least two of the R groups are alkoxy or halogen in the presence of alkali metal. The product sets up to a hard material on exposure to moisture. The preferred alkali metal is sodium which can be used either in sand or as a melt or as an amalgam.

A completely saturated modified rubber suitable for reaction with a functional amine according to this invention can be prepared by hydrohalogenation of an olefin/diolefin copolymer. This resulting rubber product can be vulcanized by diamines or further modified to contain the group —$SiR_3$. In this form, they cross-link on exposure to moisture. These polymeric materials are useful as weather-resistant mastic bases.

A water-curable elastomer can be prepared by reacting halogenated polymers with an alkali metal and a silicon compound. The resulting rubber or semiliquid fluid is use for for coatings, mastic preparations and as dry rubber.

To illustrate the above with a specific example, an iso-olefin/diolefin copolymer, i.e., butyl rubber, is dissolved in an inert solvent and halogenated to the extent of one substituted halogen atom for each olefin linkage originally present in the polymer or less. The solution is then freed of unreacted halogen or halogenating compound and all hydrogen halides.

To this solution is then added silicon tetrachloride or tetraalkoxy silanes in the amount of at least one mole of the silicon compound for each gram atom of combined halogen in the polymer. To this mixture is added a finely dispersed alkali metal such as Na or K and the mixture is heated until a major portion of the halogen atoms in the polymer have been replaced by the —SiR$_3$ group where R is halogen or alkoxy. The solution is then separated from the excess alkali metal where it can be used as is or the polymer itself can be obtained by solvent evaporation.

Halogenated hydrocarbon polymers can also be reacted with esters of orthosilicic and/or orthotitanic acids to produce a modified polymer which on exposure to moisture is converted to a cross-linked elastomer. For instance, 8 grams of Enjay Butyl HT–68 (a chlorinated isobutylene-isoprene copolymer) containing 1.25 wt. percent chlorine and having a Mooney viscosity of ML 1'+3' @ 260° F.=50–60 was dissolved in 100 ml. of benzene. The solution was charged to a dry reaction vessel and the system kept under dry nitrogen. This solution was heated to 70° C., then there were added 0.2 gram Si(OC$_2$H$_5$)$_4$ and 0.1 gram Ti(OC$_4$H$_9$)$_4$. The mixture was stirred for one hour at this temperature, then cooled.

A portion of this solution was poured into a mold and the solvent evaporated therefrom in a dry box. When the solvent had evaporated, the film was exposed to moisture for 15 minutes in a steam bath. After this treatment, the polymer was not soluble in benzene, but swelled.

Films made from this material were exposed to the atmosphere at ambient temperature and were found to cross-link similarly in time.

While several techniques for the preparation of water curable butyl-type elastomers have been described above, another practical example of a method for preparing water-curable compounds of halogenated polymers for use either as dry rubber or the preparation of solutions is set forth as follows.

A halogenated butyl is charged to a Banbury or similar type mixer along with fillers (e.g., carbon black) dispersing aids, oil extenders, etc. To the Banbury charge there is also included a sufficient quantity of an inorganic compound capable of reacting with water (e.g., CaO) to ensure that moisture present in the rubber and filler is combined. These materials are then mixed together thoroughly following which an amino alkyl silicon trialkoxide (e.g., γ-aminopropyl silicon triethoxide) is added, preferably as a solution in an extender oil, and mixing is continue at least five minutes at a temperature of 250° F. or above. The compound is then removed from the mixing chamber and stored in a dry room until ready for further processing.

Other materials which will cure on exposure to moisture can be prepared from copolymers of vinyl monomers with vinyl chloride or bromide by appending —SiR$_3$ groups by any of the processes described above or the one which follows. Physical properties of the polymer are improved and temperature ranges of application are broadened.

Copolymers of vinyl monomers (e.g., acrylonitrile) vinyl acetate, vinyl butyrate, styrene, etc.), containing at least one mole percent of vinyl chloride or vinyl bromide are prepared by a solution process, or a suspension process in a liquid which on heating will be a solvent for the polymer. The copolymers are then reacted in solution with sodium and SiR$_4$ where R is halogen, alkoxy or acyloxy.

These copolymers, if kept dry, can be formed by vacuum forming, extrusion, molding, plastisols, etc. for conversion into finished articles which will cross-link on exposure to moisture.

The physical properties and temperature range of applicability are considerably enhanced as a result of this cross-linking.

Although there are many ways of preparing suitable halogenated polymers if it is desired that the chains be comparatively short, the degradative halogenation of hydrocarbon polymers, examples of which are given below, is one preferred technique. The resulting halogenated polymers of lower molecular weight and with halogen functionality at least part of which is located at or near the polymer chain ends are then reacted with a functional silane compound as described above.

The invention is further illustrated by the following examples.

*Example 1*

A 2 l. round bottomed flask fitted with stirrer, thermometer well and two other ports was wrapped in aluminum foil to shield the reaction from light. To the flask were added 1100 ml. of a solution of polyisobutylene having a mol wt. of about $10^6$ in benzene (5 g. polymer/100 ml. benzene). The solution was heated to 75° C. while blowing with nitrogen.

One ml. of bromine (~3 g.) was added and at about 5 minute intervals, ~1 ml. of a solution of benzoyl peroxide (0.05 g.) in benzene (15 ml.) was added from a dropping funnel. When all of the catalyst solution had been added, the solution was still strongly colored by bromine.

At this point, there were added 0.05 g. azobisisobutyronitrile and at the end of about 2 hours, the solution was still highly colored. Another 0.05 g. of catalyst was added and the reaction mixture allowed to reflux overnight.

On the following morning the reaction mixture was only lightly colored. The solution was decolorized by the addition of an aqueous solution of sodium bisulfite, washed twice with water in a separatory funnel, then dried over anhydrous sodium sulfate. The dry solution was then filtered into a crystalllizing dish, evaporated to near dryness, then dried in a vacuum oven at 40° C.

The polymer analyzed 2.03% Br and had a viscosity average molecular weight of 108,500. Since the molecular weight of the original polymer was well over 1,000,000 (viscosity average) the intended simultaneous molecular weight degradation and introduction of bromine had been effected.

The analytical data suggest the introduction of 15 bromine atoms into each polymer molecule on the average. In theory 3 to 5 of these should be located near the end of each chain.

*Example 2*

A 25 vol. percent solution of the above-described polymer in Example 1 was made in benzene based on the vol. of the total solution. The solution equivalent of 2.5 g. of polymer was charged to several 2 oz. bottles. To one bottle 0.2 ml. of γ-aminopropyltriethoxysilane was added. To another bottle, this same amount of reagent was added along with 0.3 g. of a paste of MgO in a hydrocarbon oil to act as a hydrogen halide scavenger. To another bottle 0.05 ml. of diethylene triamine was added along with ~0.3 g. of a zinc oxide paste and to the last bottle 0.2 ml. of diethylene triamine was added. The bottles were capped tightly and placed in a steam bath at 100° C. and allowed five hours to react.

At the end of this time all bottles showed some discoloration (brown-red tone). The contents of the bottles containing the silane modified polymer were placed into aluminum weighing dishes, allowed to evaporate to dryness and then exposed to live steam.

After several hours, the polymer turned whitish due to water absorption and also became tough, insoluble in benzene and adhered strongly to the aluminum dish.

*Example 3*

(A) A highly cross-linked rubber was obtained in a short time using the technique of this example. Ten grams of a brominated isobutylene-isoprene copolymer was prepared by the reaction of bromine with a solution of the copolymer in hexane. The copolymer before halogenation had a viscosity average molecular weight of about 420,000 and an unsaturation of about 1.7–1.8 mole percent. The finished halogenated polymer contained 2.5% bromine and was dissolved in 210 ml. of benzene.

The solution was charged to a dry reaction vessel and heated under nitrogen at 80° C. in the presence of 1.0 g. of $NH_2(CH_2)_3Si(OEt)_3$. The mixture was stirred for 2 hours at this temperature and cooled. Ten grams of $Na_2B_4O_7 \cdot 10H_2O$ (borax) were mixed with the rubber solution and the solvent was then evaporated at room temperature in a vacuum. The recovered rubber was introduced in a dried 4 oz. glass jar which was then tightly closed and heated at 70° C. for 1 hour in a steam bath. A highly cross-linked rubber was obtained which was not soluble in benzene. Note the rubber was prevented from actually contacting the live steam and, therefore, the resulting curing effect was due to water of hydration ejected by the borax.

(B) Ten point four grams of the brominated polymer described in 3A was dissolved in 210 ml. of benzene. The solution was charged to a dry reaction vessel and heated under nitrogen at 80° C. in the presence of 1 gram of $NH_2(CH_2)_3Si(OEt)_3$. The mixture was stirred for 2 hours at this temperature and then cooled. A portion of the reaction mixture was poured into a mold and the solvent evaporated therefrom under a vacuum. The film obtained was subsequently cured by exposure to ambient air for 24 hours at room temperature.

The following physical properties were found: Tensile strength 815 p.s.i., elongation 400%, volumetric swell in cyclohexane (21° C.) 430%.

(C) In a similar experiment 7.17 g. of a brominated butyl rubber (prepared by bromination with liquid bromine of a solution of an isobutylene-isoprene copolymer having a viscosity average molecular weight of about 330,000 and a mole percent unsaturation of between 0.8–1.0%) containing 1.25% Br was dissolved in 100 ml. of n-heptane and stirred in a flask under nitrogen for 2 hours at 90° C. with 0.14 g. of $$NH_2(CH_2)_3Si(OEt)_3$$

The film, obtained by evaporation of the solvent was cured by exposure to ambient air for 70 hours at room temperature and had the following physical properties: Tensile strength 1486 p.s.i., elongation 900%, volumetric swell in cyclohexane (21° C.) 922%.

*Example 4*

Thirty grams of Neoprene WRT (a commercial polychloroprene rubber having a Mooney viscosity (ML 2½ @ 212° F.) of 48 ±6) were dissolved in 270 ml. of dry toluene. Using 50 ml. aliquots of this solution, the following mixtures were prepared:

| Sample: | G. γ-aminopropyltriethoxysilane |
|---|---|
| A | 0 |
| B | 0.188 |
| C | 0.283 |
| D | 0.377 |

The solution were then heated in tightly capped flasks for 4 hours at ~95° C. Following this, the solutions were poured into circular tin molds (can covers), and the solvent allowed to evaporate and the rubber cured by reaction with moisture.

*Example 5*

The procedure here was identical with that of Example 4 except that the mixtures were allowed to react for 5 hours at ~95° C. and Hercules CHR rubber (an oil resistant, rubbery, substantially amorphous polymer derived from homopolymerization of epichlorohydrin) was used instead of Neoprene WRT and films were cast from the reaction product.

After setting for a number of weeks to allow for complete cure by the slow permeation of moisture, the extent of cross-linking for the samples of both Examples 4 and 5 was measured by swelling specimens in benzene. The swelling and solubility data appear in the following table:

TABLE

| Rubber | Sample | Percent Insoluble Rubber | Wt. Benzene Imbibed per Wt. Insoluble Rubber |
|---|---|---|---|
| Example 4: Neoprene WRT | A | 0 | [1]∞ |
|  | B | 71.0 | 11.48 |
|  | C | 80.3 | 5.91 |
|  | D | 94.3 | 3.20 |
| Example 5: Hercules CHR | E | 0 | [1]∞ |
|  | F | 94.3 | 3.20 |
|  | G | 95.8 | 2.53 |
|  | H | 96.5 | 2.43 |

[1] Soluble.

The data show that both rubbers were modified by the reaction so that they become insolubilized on exposure to moisture. As anticipated, the swelling capacity of the cross-linked rubbers decreased with increasing reagent indicating an increasing concentration of cross-links in the vulcanizate.

*Example 6*

In this example, 120 g. of chlorinated butyl rubber containing about 1.20% chlorine were dissolved in dry n-heptane (1200 ml.). To this solution were added 11 grams of γ-aminopropyltriethoxysilane. The mixture was then heated to 95° C. under a nitrogen blanket and held at this temperature for 22 hours. The solution was then cooled and placed in dry pint bottles in a dry box.

About 50 ml. of the solution was poured into an aluminum foil dish, the solvent allowed to evaporate, and the rubber allowed to cure by exposure to an atmosphere of 100% relative humidity at 25° C. for ~3 days. At the end of this time, the rubber was found to be insolubilized to the extent of 92.3%, and the molecular weight between cross-links, $M_c$, as estimated by its swelling capacity was 16,000 indicating a respectably high cross-link density.

*Example 7*

To a benzene solution of polyisobutylene having a molecular weight of about $10^6$ (7.5 g. polymer/100 g. benzene) was added azobis (isobutyronitrile) and bromine. The mixture was then heated to reflux as described in Example 1. During the course of the reaction, a slow stream of chlorine gas was introduced. One purpose for this was to oxidize the evolved HBr back to bromine thereby getting better utilization of the more expensive bromine. The recipe was:

| | |
|---|---|
| Polymer | 100 g. |
| Azobis (isobutyronitrile) | 0.4 g. |
| Bromine | 6 g. |
| Chlorine | 6.1 g. (over ~2 hr. period). |
| Reaction time/temp. | ~2 hrs./80° C. |

This polymer was collected by evaporation of the solvent in a steam bath and drying in a vacuum oven at 70° C. The polymer analyzed:

| | |
|---|---|
| $M_v$ | 15,100 |
| Percent Br | 4.54 |
| Percent Cl | 1.02 |
| n(Br) [1] | 4.92 |
| n(Cl) [1] | 2.40 |

[1] n=number of atoms/polymer molecule.

Probably some of this halogen may have represented residual impurities (bromo and/or chlorobenzenes) not completely removed by the drying procedure.

*Example 8*

One hundred grams of polyisobutylene having a molecular weight of about $10^6$ were dissolved in 1250 ml. of carbon tetrachloride. To this solution were added 1 g. azobis(isobutyronitrile) and 15 g. of bromine. The mixture was heated to reflux as previously described and held at this temperature for 4 hours. The collected polymer analyzed as follows:

| | |
|---|---|
| $M_v$ | 12,340 |
| Percent Br | 3.83 |
| Percent Cl | 0.03 |
| $n(Br)$ [1] | 3.37 |
| $n(Cl)$ [1] | 1 |

[1] $n$=number of atoms/polymer molecule.

Thus, carbon tetrachloride is an acceptable and even preferred solvent for the reaction.

*Example 9*

In still other experiments, polymers prepared by the degradative halogenation of polyisobutylene as described in Examples 8 and 9 were reacted with a functional silane compound. Pertinent data from the experiment are tabulated in the following table:

TABLE

| Sample | Percent Br | $\bar{M}_v$ [1] | $\bar{M}_n$ [2] | G. reagent [3] / G. polymer | Cure | Percent Insol. Rubber | $M_c$ [5] |
|---|---|---|---|---|---|---|---|
| I | 3.87 | 12,830 | 7,100 | 0.064 | 3 days at RT [4] and 100% Rel. Hum. | 63.2 | 56,000 |
| J | 3.87 | 12,830 | 7,100 | 0.108 | ...do... | 74.6 | 23,000 |
| K | 3.87 | 12,830 | 7,100 | 0.143 | ...do... | 79.2 | 18,500 |
| L | 4.09 | 19,160 | 10,500 | 0.105 | ...do... | 67.7 | 38,500 |
| M | 4.09 | 19,160 | 10,500 | 0.116 | ...do... | 68.9 | 42,000 |

[1] Viscosity average molecular weight.
[2] Number average molecular weight.
[3] γ-aminopropyltriethoxysilane reacted with polymer for 24 hours at 150° F.
[4] Room temperature.
[5] Number average molecular weight between cross-links.

These data show very clearly that the modification of a variety of halogen-containing polymers by reaction with aminoalkylalkoxysilanes results in the preparation of very useful polymers which vulcanize upon exposure to the atmosphere.

Although the invention has been described with a certain degree of particularity, it will be understood that minor modifications and changes can be made therein without departing from the spirit of the invention as hereinafter claimed.

What is claimed is:

1. A process for preparing moisture curable, polymeric materials which comprises reacting a portion of the halogen radicals of a halogenated polymer with a functional silane compound, said silane compound having at least one functional group capable of reacting with said halogen radical and having at least two hydrolyzable constituents directly bound to the Si atom.

2. A process according to claim 1 wherein the halogen of said halogenated polymer is present because it has replaced a hydrogen atom originally present in the polymer.

3. A process according to claim 1 wherein said silane compound has the general formula, $X(R)Si(R')_3$ wherein X is a functional group capable of reacting with halogen radicals and R is a hydrocarbon radical having from 1–30 carbon atoms and R' is a hydrolyzable radical.

4. A process according to claim 3 wherein X is an amino group, R is an aliphatic hydrocarbon having from 1–6 carbon atoms and R' is selected from the group consisting of halogen, acetoxy or alkoxy radicals having from 1–20 carbon atoms.

5. A process according to claim 4 wherein said polymer is an elastomer.

6. A process according to claim 4 wherein said polymer is a "liquid" rubber having a number average molecular weight below about 20,000.

7. A process according to claim 1 wherein the functional group is selected from the group consisting of halogen, alkoxy and acyloxy and the Wurtz synthesis method is used for the reaction.

8. A process according to claim 5 wherein said elastomer is butyl rubber.

9. A process according to claim 6 wherein said halogen is chlorine.

10. A process according to claim 6 wherein said halogen is bromine.

11. A process according to claim 1 further characterized wherein the reaction product is compounded with inorganic salts containing water of hydration.

12. A method of preparing a moisture-curable elastomer which comprises in combination the steps of reacting a halogenated butyl rubber with $NH_2(CH_2)_3Si(OEt)_3$ in quantities necessary to result in a product cross-linkable by exposure to moisture.

No references cited.

JOSEPH L. SCHOFER, *Primary Examiner.*

R. C. GAITHER, *Assistant Examiner.*